United States Patent [19]

Servais et al.

[11] Patent Number: 4,894,278
[45] Date of Patent: Jan. 16, 1990

[54] PROCESS OF MANUFACTURING A DECORATIVE MIRROR

[75] Inventors: Albert Servais, Gerpinnes; Bernard Somerhausen, Nivelles, both of Belgium

[73] Assignee: Glaverbel, Brussels, Belgium

[21] Appl. No.: 210,011

[22] Filed: Jun. 22, 1988

[30] Foreign Application Priority Data

Jun. 23, 1987 [GB] United Kingdom ............... 8714667

[51] Int. Cl.$^4$ .......................... B05D 5/06; B32B 3/00
[52] U.S. Cl. ................................. 428/201; 427/165; 427/168; 427/262; 427/266; 427/287; 427/343; 427/404; 427/427; 428/209; 428/210; 428/213
[58] Field of Search ............... 427/165, 168, 343, 404, 427/427, 402, 287, 262, 266; 428/201, 210, 209, 213

[56] References Cited

U.S. PATENT DOCUMENTS

| | | | |
|---|---|---|---|
| 1,413,429 | 4/1922 | Robson | 427/262 |
| 1,604,459 | 10/1926 | Lyons | 427/168 |
| 3,152,948 | 10/1964 | Nathans et al. | 427/168 |
| 4,255,214 | 3/1981 | Workens | 148/6.14 |
| 4,673,596 | 6/1987 | Shojii et al. | 427/262 |

FOREIGN PATENT DOCUMENTS

| | | |
|---|---|---|
| 1074076 | 6/1967 | United Kingdom . |
| 1250142 | 10/1971 | United Kingdom . |
| 2102453 | 7/1981 | United Kingdom . |

*Primary Examiner*—Janyce Bell
*Attorney, Agent, or Firm*—Spencer & Frank

[57] ABSTRACT

A decorative mirror having a reflective silver layer deposited on a transparent sheet. A substance which reacts with silver is applied to the silver layer to create randomly distributed areas containing reaction products including non-metallic silver where the visible light reflectance of the mirror is modified or interrupted. In order to manufacture the mirror, a transparent sheet is wetted with a silvering solution to form a reflective silver layer, and while the sheet is still wet with the silvering solution the sheet is contacted with randomly distributed droplets of a solution of a substance which reacts with silver, the two solutions being made up using different solvents. The substance which reacts with silver may be a tin compound in an alcoholic solution, the silvering being effected with an aqueous solution. The silver layer whose reflective properties have been modified may be overcoated with a second silver layer, and the whole protected with further layers, for example of copper and paint.

11 Claims, No Drawings

PROCESS OF MANUFACTURING A DECORATIVE MIRROR

BACKGROUND OF THE INVENTION

Field of the Invention

This invention relates to a decorative mirror comprising a reflective silver layer deposited on a transparent sheet, and it includes a process of manufacturing a decorative mirror comprising wetting a transparent sheet with a silvering solution to form a reflective silver layer thereon.

SUMMARY OF THE INVENTION

Plain or white silver mirrors which have substantially uniform reflectance throughout the visible spectrum are of course extremely well known.

It is an object of this invention to produce a mirror having a patterned appearance which may be thought aesthetically desirable.

According to the invention there is provided a decorative mirror comprising a reflective silver layer deposited on a transparent sheet, characterised in that a substance which reacts with silver has been applied to a said silver layer to create randomly distributed areas containing reaction products including nonmetallic silver where the visible light reflectance of the mirror is modified or interrupted.

Such a mirror exhibits a patterned reflection which may be thought aesthetically desirable.

BRIEF DESCRIPTION OF THE DRAWING

FIG. 1 is a schematic view of apparatus for forming a mirror in accordance with the invention.

DETAILED DESCRIPTION OF THE INVENTION

There are various substances which react with silver which may be applied to the silver layer in order to modify or interrupt the reflectance of the mirror. Among these are compounds such as halides and cyanides of metals such as lead, nickel, iron, cobalt and tin which can oxidise the silver of the layer or form complexes with it. In preferred embodiments of the invention, the substance which reacts with silver is such that the reaction products include tin ions. Tin halides in particular can form complexes with silver, and if suitably protected against weathering, such complexes are stable, so that the appearance of the mirror is preserved for a useful length of time.

In some preferred embodiments of the invention, at least part of at least some of said randomly distributed areas are substantially black in reflection.

The silver layer having said randomly distributed areas containing reaction products may contain all the silver in the mirror, or there may be additional silver present. In some preferred embodiments, the silver layer having said randomly distributed areas containing reaction products is overcoated by a second silver layer, since this gives an enhanced decorative effect. Light reflection and contrast over the areas containing reaction products can be modified by adjusting the thicknesses and the relative thicknesses of the two layers of silver. For example the first layer may be a layer containing 50 to 250 mg Ag/m$^2$ which, while being reflective, exhibits, on its own, a greater or lesser degree of transparency, while the second layer is thick enough to render the total silver layer opaque, and brings the total amount of silver to 700 to 800 mg Ag/m$^2$ or more.

It is presently preferred that said second silver layer is at least twice as thick as the first.

In place of such a second silver layer, other preferred embodiments of the invention, include a nickel layer in contact with the silver layer having said randomly distributed areas containing reaction products. This can provide the mirror with a different appearance when the underlying silver layer is not wholly opaque.

Advantageously, the silver layer is overcoated by a copper layer. The use of a copper overcoating is well known per se in the field of white silver mirros, and such layers are known to have a protective effect in preserving the silver layer against weathering. This advantage is also apparent in the case of mirrors according to this invention. A further advantage of the use of a copper overcoating is apparent in the case where the underlying silver is not wholly opaque. In that case, there will be some reflectance at the copper layer, and this will have an effect in modifying the colour of the reflected light, thus providing the mirror with a further different appearance which may also be thought to be aesthetically desirable.

Advantageously, the or the uppermost metallic layer has been contacted by a substituted azole. Such azole treatment is known per se both for protecting layers of silver and layers of copper against corrosion. Further details of such treatments may for example be found in British Patent Specifications Nos. 1,074,076 (Pittsburgh Plate Glass Co.), 1,250,142 (Shikoku Kasei Kogyo Co. Ltd) and 2,102,453 (Glaverbel), and in U.S. Pat. No 4,255,214 (Falconer Plate Glass Corp.). Such azole treatments can provide a very effective barrier against corrosion of the underlying metal and thus increase the useful life of the product.

Preferably, the coated face of said sheet is given a protective coating of paint or varnish. Such a coating also affords some protection to the metal against corrosion, and also protects the coated surface of the sheet against scratches.

The invention includes a process of manufacturing a decorative mirror comprising wetting a transparent sheet with a silvering solution to form a reflective silver layer thereon, characterised in that while the sheet is still wet with said silvering solution the sheet is contacted with randomly distributed droplets of a solution of a substance which reacts with silver, the two said solutions being made up using different solvents, thereby to create randomly distributed areas containing reaction products including non-metallic silver where the visible light reflectance of the mirror is modified or interrupted.

This is a very simple and effective way of producing a mirror which exhibits a patterned reflection which may be thought desirable.

Because the solutions are made up using different solvents, when droplets of the second impinge on the sheet which is still wet with the first, distribution of the areas where the reaction between the solutes take place will be affected by surface tension effects as the two liquids first come into contact with each other, thus giving a pattern which may be thought desirable.

The way in which the droplets of the second solution spread out can be affected by appropriate choice of solvent. In preferred embodiments of the invention, said silvering solution is an aqueous solution, and said solution of a substance which reacts with silver is an alcoholic solution. Methanol, and particularly ethanol are the preferred alcoholic solvents.

Another way of modifying the distribution of the areas which will contain the reaction products is to modify a spraying technique by which droplets of the second solution impinge on the sheet. Such spraying may be effected by conveying the sheet past a reciprocating spray head. We have found that inclining the spray jet in the direction of conveyance for example at an angle of 35° to 50° to the horizontal tends to result in relatively large patches containing reaction products, while inclining the spray jet in the opposite direction, for example at 25° to 45° to the horizontal gives rather smaller spots which contain coating reaction products. It is not necessary that such second solution should be sprayed at great pressure. We have found that a spray pressure of 0.5 kg/cm² gauge gives good results.

There are various substances which react with silver which may be applied to the silver layer in order to modify or interrupt the reflectance of the mirror. Among these are compounds such as metallic salts for example halides and cyanides of metals such as lead, nickel, iron, cobalt and tin which can oxidise the silver of the layer or form complexes with it. Preferably, said substance which reacts with silver is a tin compound. Tin halides in particular can form complexes with silver, and if suitably protected against weathering, such complexes are stable, so that the appearance of the mirror is preserved for a useful length of time. Advantageously, said substance which reacts with silver is a metal halide, preferably a metal chloride. In particular, stannous chloride is readily soluble in alcohol in the concentrations required for the purpose in view. A suitable solution is ethanol containing $SnCl_2.2H_2O$ in an amount of about 5 to 20 g/L.

In some preferred embodiments of the invention, after treatment with said solution of a substance which reacts with silver, the sheet is washed and a second layer of silver is deposited. This allows light reflection and contrast over the areas containing reaction products to be modified by adjusting the thicknesses and the relative thicknesses of the two layers of silver, and can give an enhanced decorative effect. For example the first layer may be built up to contain 50 to 250 mg $Ag/m^2$ which, while being reflective, exhibits, on its own, a greater or lesser degree of transparency, while the second layer is built up enough to render the total silver layer opaque, and bring the total amount of silver to 700 to 800 mg $Ag/m^2$ or more.

A conventional silvering solution known per se for the production of white mirrors may be used, and it is convenient to spray such a solution at a gauge pressure of about 5 kg/cm² to deposite any silver on the sheet.

Such second silver layer is preferably deposited to a thickness at least twice as great as the first.

Advantageously, a copper layer is deposited on top of the silver. Such copper layer may be built up using any coppering technique known per se, and has the advantage of protecting the silver against corrosion, and, if the total silver layer is partly transparent, it will have an effect in modifying the colour of the mirror in reflection.

Preferably, the or the uppermost metallic layer is contacted with a substituted azole. This gives a very effective protection against corrosion of the metallic deposit on the sheet.

Advantageously, the coated face of said sheet is given a protective coating of paint or varnish. This too gives protection against corrosion, and also against scratching.

A preferred embodiment of the invention will now be further described with reference to the accompanying diagrammatic drawing, FIG. 1, which is a schematic view of apparatus for forming a mirror in accordance with the invention.

In FIG. 1, glass sheets are transported along a path 1 by conveyor rolls 2. The sheets travel from left to right in the drawing. The sheets pass first under optional polishers such as 3, comprising orbiting pads supplied with a mixture of cerium oxide and calcium carbonate powders in order to polish the glass to provide a fresh surface for the reception of the silver layer. This step may be omitted, particularly if the surface of the glass is poor in alkali metal ions.

The optional polishing step is followed by spraying with demineralised water from spray station 4, by a brushing treatment using rotary brush 5, and a further water spray from spray station 6 in order to remove all traces of the polishing powder and provide a clean surface for receiving the silver layer.

A dilute (aqueous) solution of stannous chloride is then sprayed against the glass from spray station 7 to prepare the sheets for the silvering treatment. This solution may for example contain 20mg/L stannous chloride. The solution may optionally be acidic.

The sheets then pass beneath successive spraying stations 8, 9, 10, 11 and 12 where the glass is sprayed respectively with demineralised water, with silvering solutions, with a substance which reacts with silver create randomly distributes areas containing reaction products including non-metallic silver where the visible light reflectance of the mirror is modified or interrupted and then again with demineralised water. Conventional aqueous silvering solutions comprising a silver salt solution and a reducing agent may be used, and a suitable solution of substance which reacts with silver contains $SnCl_2.2H_2O$ in an amount of about 5 to 20 g/L ethanol.

The sheets next pass beneath a group of optional spraying stations 13, 14 respectively spraying metallising solutions for depositing an optional second layer of silver on the mirror, or an optional layer of nickel, and another station 15 spraying demineralised water for washing.

A protective copper layer is applied at spraying stations 16, 17. The copper layer is applied by spraying a solution containing copper and an activator which reacts with the copper-containing solution to cause metallic copper to be deposited on the glass. A conventional coppering solution and activator may be used. Excess coppering solution is rinsed off with demineralised water at spraying station 18.

The coppered mirror then pass beneath air blowers such as 19, which act to dry the deposited copper layer for a following azole protection treatment, performed by spraying an appropriate azole solution from spray station 20. Excess azole solution and reaction products are then washed off by spraying demineralised water from spray station 21, and the azole protected coppered mirror is again dried, by hot air blower 22, prior to the application of a protective paint layer sprayed from spray station 23.

If it is desired to apply a protective layer in some other way, for example by bonding the coppered sheet to another sheet to form a laminate, the painting step may be omitted.

Each spray station may comprise a plurality of stationary spray guns arranged to give uniform spray coverage across the full width of the glass path 1, but it is generally more convenient to make use of reciprocating spray guns.

EXAMPLE 1

Sheets of soda-lime glass 6mm thick manufactured by the float process and measuring 3.2m by 1.8m are conveyed at a speed of 2.3m/min through a mirror coating apparatus such as that just described.

The sheets are polished in a conventional manner using cerium oxide powder, rinsed and brushed, and treated with stannous chloride as described above.

The wet sheets then pass through the (first) silvering zone where they are sprayed with a conventional aqueous silvering solutions from spray stations 9 and 10, at a gauge pressure of about 5kg/cm$^2$. The flow rate and concentration of the silvering solutions are arranged to form a silver layer containing about 150mg/m$^2$silver. A solution of substance which reacts with silver containing $SnCl_2.2H_2O$ in an amount of about 5 to 20 g/L ethanol is sprayed at a gauge pressure of 0.5kg/cm$^2$ from spray station 11.

This process will result in the formation of a silver layer which is stained with randomly distributed areas which contain non-metallic silver reaction products including tin ions. The mean size of these stains can be altered by controlling the reaction conditions. Among steps which can be taken to control the reaction conditions are the following:

1. for promoting the formation of small stains, to reduce the thickness of the liquid layer on the sheet entering the silvering station, for example by means of a squeegee.

2. again for promoting the formation of small stains, to incline the tin chloride spray jet from spraying station 11 in the upstream direction as shown in the drawing, so that the axis of that jet is at about 35° to the horizontal.

3. for promoting the formation of large stains, to incline the tin chloride spray jet from spraying station 11 in the downstream direction, that is with the opposite inclination to that shown in the drawing, so that the axis of that jet is at about 42° to the horizontal.

4. to increase or reduce the rate at which the tin chloride spray jet is caused to reciprocate across the path of the sheets respectively to reduce or increase the size of the stains.

After a suitable time has been allowed for the formation of the stained silver layer, excess material is flushed off from the surface of the sheets by spraying demineralised water from spray station 12.

The sheets next pass beneath spray stations 13, 14 spraying additional silvering solutions, in order to increase the total amount of silver deposited to between 700mg/m$^2$ and 800mg/m$^2$. Again conventional silvering solutions are used. Flushing takes place at water spraying station 15.

In place of that optional additional deposit of silver, a nickel layer may be deposited if desird.

The sheets then pass beneath spray stations 16, 17 spraying coppering solution and activator, to to build up a copper layer of the required thickness. A conventional coppering solution and activator are used. Flushing takes place at water spraying station 18.

The coppered mirrors then pass beneath air blowers such as 19, which act to dry the deposited copper layer for a following azole protection treatment, performed by spraying an appropriate azole solution from spray station 20. Excess azole solution and reaction products are then washed off by spraying dimineralised water from spray station 21, and the azole protected coppered mirror is again dried, by hot air blower 22, prior to the application of a protective paint layer sprayed from spray station 23.

In this Example, aminotetrazole is sprayed onto the copper coating at ambient temperature, the glass is warmed, and more aminotetrazole is sprayed on at a temperature of between 50° C. and 70° C. The solution used is aqueous containing aminotetrazole. After a dwell time of 2 to 3 minutes, the glass passes beneath wash spray station 21, whereafter the azole protected metal layer is dried and coated with an alkyd paint layer about 40 $\mu$m thick.

We claim:

1. A process of manufacturing a decorative mirror comprising at least one reflective silver layer provided on one face of a transparent sheet, the process comprising the steps of:
   a. wetting the face of the transparent sheet with a silvering solution to form a wet layer comprised of silver thereon; and
   b. contacting the wet layer, while the wet layer is still wet with the silvering solution, with randomly distributed droplets of a salt solution comprised of a metallic salt, which metallic salt reacts with silver to oxidize same or form a complex therewith, and causing reaction thereof with the silver in the wet layer to provide a first silver layer having reaction products including non-metallic silver therein, thereby creating randomly distributed areas containing reaction products including non-metallic silver within the first silver layer of the at least one reflective silver layer, whereby the visible light reflectance of the decorative mirror is modified or interrupted and wherein said silvering solution and said salt solution are made up using different solvents.

2. The process according to claim 1, wherein said silvering solution is an aqueous solution, and said salt solution is an alcoholic solution.

3. The process according to claim 1, wherein said metallic salt is a tin compound.

4. The process according to claim 1, wherein said metallic salt is a metal halide.

5. The process according to claim 1, further comprising the steps of washing the transparent sheet after treatment with said salt solution in step a and repeating step a to provide a second layer of silver.

6. The process according to claim 5, wherein said first silver layer and said second silver layer have respective thickness and wherein the thickness of said second silver layer is at least twice as great as the thickness of said first silver layer.

7. The process according to claim 1, wherein a copper layer is deposited on top of the at least one reflective silver layer.

8. The process according to claim 1, wherein the decorative mirror has an uppermost metallic layer, and wherein the uppermost metallic layer is contacted with a substituted azole.

9. A process according to claim 1, wherein the decorative mirror has an uppermost metallic layer, further comprising the step of coating the uppermost metallic layer with a protective coating of paint or varnish.

10. A decorative mirror made by a process according to claim 1.

11. The process according to claim 4, wherein the metal halide is a metal chloride.

* * * * *